US009341213B2

(12) United States Patent
Sheridan (10) Patent No.: US 9,341,213 B2
(45) Date of Patent: May 17, 2016

(54) QUICK RELEASE ROLLER SLEEVE MOUNTING HUB (71) Applicant: Joseph M. Sheridan, Lakeland, FL (US)

(72) Inventor: Joseph M. Sheridan, Lakeland, FL (US)

(73) Assignee: FRC Holding Corp., Des Plaines, IL (US)

( * ) Notice: Subject to any disclaimer, the term of this patent is extended or adjusted under 35 U.S.C. 154(b) by 0 days.

(21) Appl. No.: 13/655,590

(22) Filed: Oct. 19, 2012

(65) Prior Publication Data

US 2014/0113784 A1   Apr. 24, 2014

(51) Int. Cl.
*B21K 1/02* (2006.01)
*F16C 13/00* (2006.01)
*B41N 7/00* (2006.01)

(52) U.S. Cl.
CPC . *F16C 13/00* (2013.01); *B41N 7/00* (2013.01); Y10T 29/49558 (2015.01)

(58) Field of Classification Search
CPC ....... B65H 27/00; F16C 13/00; B41F 27/005; B41F 27/10; B41F 27/105; B41N 7/00; B41N 7/06; B41C 1/182; B65G 39/07; F27D 3/026; G03G 15/0928; B21B 27/032; B21B 27/035
USPC .................. 492/45, 47, 48; 29/895.2, 895.21, 29/895.22, 895.23
See application file for complete search history.

(56) References Cited

U.S. PATENT DOCUMENTS

| 1,930,999 | A | * | 10/1933 | Gaskell | 492/40 |
| 2,715,879 | A | * | 8/1955 | Sawyer | 492/45 |
| 2,750,634 | A | * | 6/1956 | Schurr et al. | 19/258 |
| 3,805,550 | A | * | 4/1974 | Patton | 492/15 |
| 4,030,415 | A | * | 6/1977 | Fellows | 101/382.1 |
| 4,119,032 | A | * | 10/1978 | Hollis | 101/216 |
| 4,144,812 | A | | 3/1979 | Julian | |
| 4,178,664 | A | * | 12/1979 | McLoughlin | 492/56 |
| 4,352,230 | A | * | 10/1982 | Sukenik | 492/40 |
| 4,621,400 | A | * | 11/1986 | van der Graaf | 492/47 |
| 5,052,090 | A | * | 10/1991 | Kitaura et al. | 492/18 |
| 5,133,125 | A | * | 7/1992 | Diebels et al. | 29/527.2 |
| 5,289,769 | A | * | 3/1994 | Lewis | 101/218 |
| 5,398,604 | A | * | 3/1995 | Burke et al. | 101/216 |
| 5,451,198 | A | * | 9/1995 | Lancaster | 492/48 |
| 5,507,226 | A | * | 4/1996 | Burke et al. | 101/228 |
| 5,675,893 | A | * | 10/1997 | Yamada et al. | 29/895.22 |
| 5,782,181 | A | | 7/1998 | Rossini | |
| 5,819,657 | A | | 10/1998 | Rossini | |
| 5,904,095 | A | * | 5/1999 | Nelson | 101/375 |
| 6,381,429 | B1 | * | 4/2002 | Shibata et al. | 399/117 |
| 6,394,943 | B1 | * | 5/2002 | Cormier et al. | 492/47 |
| 6,401,613 | B1 | | 6/2002 | Gayle et al. | |

(Continued)

FOREIGN PATENT DOCUMENTS

WO   WO 2006114534 A2 * 11/2006
WO   WO 2010111341 A1 *  9/2010 ............. B21B 27/02

*Primary Examiner* — Essama Omgba (74) *Attorney, Agent, or Firm* — Sanford J. Piltch, Esq.

(57) ABSTRACT

A quick release roller sleeve and mounting hub assembly is described for use with high speed roller machines. The assembly includes an outer flange plate that can be detached from the assembly in order for the roller sleeve to be dismounted and a new roller sleeve mounted as the existing roller sleeve becomes worn and needs to be replaced. The quick release permits the mounting hub and other parts of the assembly to remain in their aligned configuration and positions while only exchanging the roller sleeve portion of the assembly.

11 Claims, 6 Drawing Sheets

(56) References Cited

U.S. PATENT DOCUMENTS

| | | | |
|---|---|---|---|
| 6,409,645 B1 * | 6/2002 | Paasonen et al. | 492/56 |
| 6,440,048 B1 * | 8/2002 | Bleil et al. | 492/46 |
| 6,716,148 B1 * | 4/2004 | Fortin et al. | 492/47 |
| 7,322,917 B2 * | 1/2008 | Betti et al. | 492/30 |
| 8,311,450 B2 * | 11/2012 | Tanaka et al. | 399/117 |
| 8,915,830 B2 * | 12/2014 | March et al. | 492/45 |
| 2004/0242392 A1 * | 12/2004 | Betti et al. | 492/28 |
| 2004/0255804 A1 * | 12/2004 | Hoffmann et al. | 101/375 |
| 2005/0020422 A1 * | 1/2005 | Betti et al. | 492/56 |
| 2012/0055359 A1 * | 3/2012 | Pertile et al. | 101/375 |
| 2012/0073103 A1 * | 3/2012 | March et al. | 29/402.08 |
| 2015/0072846 A1 * | 3/2015 | March et al. | 492/48 |

* cited by examiner

QUICK RELEASE ROLLER SLEEVE MOUNTING HUB

BACKGROUND OF THE INVENTION

The invention generally resides in the field of quick release roller sleeves. Roller sleeves, which are mountable and demountable from rollers and other hub-like cylindrical structures, are used in several forms of printing, metal flattening, and other manufacturing processes.

The manner in which roller sleeves are currently being mounted and demounted on the roll cores has caused problems in terms of increasing time of production due to the time required in changing the sleeve and core together which can take up to an hour or more during which time the machine onto which the roller sleeve is being mounted is shut down. Moreover, once a sleeve and core have been changed there may be issues with alignment which can lead to several wasted batches of product while the user makes alignment corrections which adds more downtime to production. Accordingly there exists a need for a quick release roller sleeve mounting hub, which cuts down significantly on the time spent on changing a roller sleeve during production and also does not require the need to remove or change the roller core eliminating the need for realigning the replacement core.

The present invention overcomes these deficiencies by utilizing a quick release roller sleeve mounting hub having a fiberglass covering. The mounting hub remains in place on the machine and, instead of the entire apparatus being removed and replaced, an outer rim flange portion can slide into and out of position for ease of dismounting a worn roller sleeve and mounting a new roller sleeve around the hub that remains in its machine mounted position at all times. The present invention allows for the existing core or hub to be continued in service while only changing the outer roller sleeve portion, resulting in the overall sleeve and core to maintain its alignment and original configuration.

Therefore, an object of the present invention is to provide a quick release roller sleeve which can be mounted and dismounted in a much shorter period of time. Another object of the present invention is to provide a quick release roller sleeve which can be mounted and dismounted without removing the roller core.

A further object of the present invention is to provide a quick release roller sleeve made from fiberglass or other composite type long-lived material. Yet another object of the present invention is to provide a quick release roller sleeve with variable face lengths and diameters. Still another object of the present invention is to provide a quick release roller sleeve which is fastened to the core by a limited number of securing means to aid in the ease of mounting and dismounting of the roller sleeve.

Another object of the present invention is to provide a quick release roller sleeve mounting hub that allows the outer sleeve portions to slide into and out of position for ease of mounting and dismounting once the roller sleeve is worn and needs to be replaced. Still another object of the present invention is to provide a quick release roller sleeve mounting hub that allows for use of the existing core or hub while only changing the outer roller sleeve portion, allowing the core to maintain its original configuration and alignment on the machinery.

Other objects will appear hereinafter.

SUMMARY OF THE INVENTION

The present apparatus may be described as a quick release roller sleeve and mounting hub for mounting to a high speed machine for printing, metal flattening or other similar functions. The quick release roller sleeve is configured to mount over and around the mounting hub or core of the assembly. Each roller sleeve is constructed of fiberglass or other composite type material with an elastomeric covering. The roller sleeve fits around the mounting hub and is sandwiched between an inward facing flange and an outward facing flange, both of which completely circumscribe the hub. Each of the flanges has a circumferential notch that mounts against the sleeve base capturing and containing the sleeve between the flanges with the sleeve supported by the hub or core. The flange notches allow for the sleeves to be appropriately positioned within the flanges and around the hub or core so that the roller sleeve, when worn and needing to be replaced, is able to slide into and out of place for ease of mounting and dismounting. The present invention allows for the existing core to remain in its aligned position on the machinery while changing only the roller sleeve portion, which allows for the entire assembly to maintain its original configuration.

The inner and outer facing flange plates are structurally identical. The inner facing flange plate is permanently secured to the metal hub or core with a plurality of threaded machine bolts in this way an existing core can be used and it can even be returned to its original configuration if desired. The outer facing flange plate is used to mount and dismount the roller sleeve by removing the flange from the hub or core, sliding the roller sleeve outward and away from the inner facing flange and off of the hub or core, mounting a new roller sleeve onto the hub or core, and replacing the outer flange to secure the sleeve in position. The outer facing flange plate provides a pinching effect on the roller sleeve between its inner surface and the inner surface of the inner facing flange plate. To maintain the roller sleeve in position and resist against slippage the paired flange plates exert an inward force against the roller sleeve that is captured in opposing flanges and bevels around the periphery of each of the flange plates. The inner facing flange, mounting hub and sleeve are assembled prior to mounting on the machinery and remain assembled until such time as the core or hub is being switched out as well.

It is sometimes advisable to maintain rotational speed and avoid slippage that the hub or the roller sleeve are engaged with each other, or with the high speed machinery by a key and cooperating keyway. The embodiments described below are each substantially similar in structure and may be utilized for differently dimensioned workpieces, some wider than others.

These together with other objects of the present invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

For the purpose of illustrating the invention, there is shown in the drawings forms which are presently preferred; it being understood, however, that the invention is not limited to the precise arrangements and instrumentalities shown.

DETAILED DESCRIPTION OF THE PREFERRED EMBODIMENTS

The following detailed description is of the best presently contemplated mode of carrying out the invention. The description is not intended in a limiting sense, and is made solely for the purpose of illustrating the general principles of the invention. The various features and advantages of the present invention may be more readily understood with reference to the following detailed description taken in conjunction with the accompanying drawings.

Figure 1:
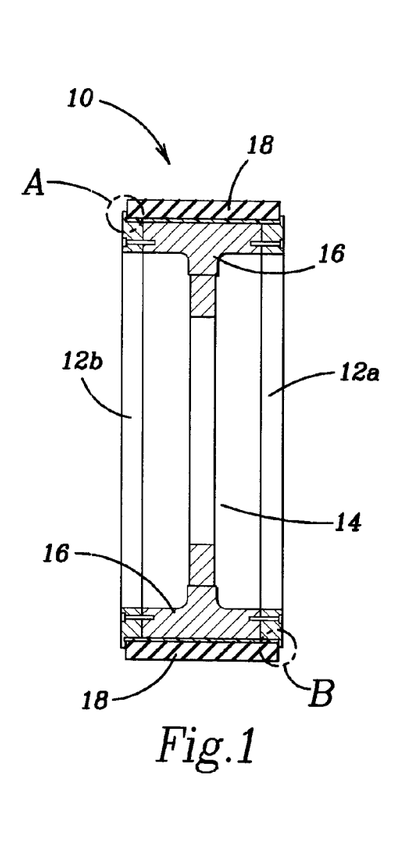
FIG. 1 is a sectional side view of the quick release roller sleeve and mounting hub of the present invention.

Referring now to the drawings in detail, where like numerals refer to like parts or elements, there is shown in FIG. 1, the quick release roller sleeve and mounting hub assembly 10 of the present invention. The quick release assembly is comprised of a pair of opposing outer and inner flange plates 12a, 12b, a mounting hub 14 having an outer support rim 16, and a roller sleeve 18. The inner flange plate 12b is secured to the support rim 16 across the inward face of the hub 14 by a set of mounting screws 13b. Likewise, the outer flange plate 12a is secured to the support rim 16 across the outward face of the hub 14 by a set of mounting screws 13a. Alternatively, the inner flange plate 12b may be manufactured as part of the hub 14 as it is not required to be removed to dismount and mount a roller sleeve 18.

Figures 1A, 1B, 2:
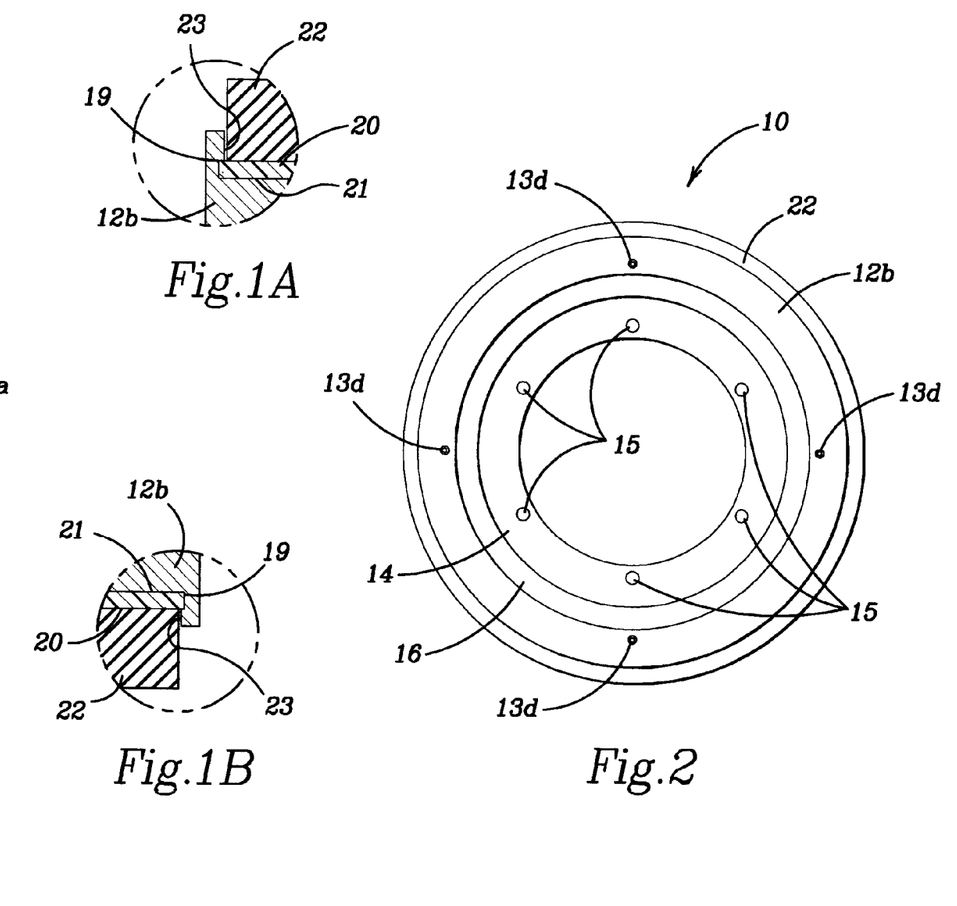
FIG. 1A is an enlarged view of the outer flange edge region on the machine side of the hub as it captures the roller sleeve mounted around the hub.
FIG. 1B is an enlarged view of the outer flange edge region on the exposed side of the hub as it captures the roller sleeve mounted around the hub.
FIG. 2 is a front view of the quick release roller sleeve and mounting hub assembly of the present invention.

Referring to FIG. 1A, the inner flange plate 12b captures the base 20 of roller sleeve 18 within cooperating circumferential notch 19 slightly inward of the outer edge of the flange plate 12b. The outer roller material 22 of sleeve 18 extends outward from the base 20 in accordance with the general dimensions set forth below. The base 20 of roller sleeve 18 is constructed of fiberglass or other composite resin-type material. The resin material may be any suitable thermoset such as an epoxy or polyester. The thickness of the base 20 of the roller sleeve 18 is in the range of 1/16 to 1/4 inches to provide stability to the outer roller material 22. As can be seen from FIG. 1B, the identical arrangement is provided for the outer flange plate 12a in capturing the base plate 20 of the roller sleeve 18. The base 20 of the roller sleeve 18 is captured in the circumferential notch 19 of the outer flange plate 12a locking the roller sleeve 18 in position between the flange plates 12a, 12b with both mounted to the hub 14.

The support rim 16 of the mounting hub 14 is slightly smaller than the roller sleeve 18 in depth and diameter which allows the roller sleeve 18 to slide onto the mounting hub 14. Each of the flange plates 12a, 12b extends the flat surface of the support rim 16 and pinches the base 20 of the roller sleeve 18 between them to secure the roller sleeve 18 to the mounting hub 14 as described above. The flange plates 12a, 12b seal the edges of the roller sleeve 18 between them and grip the base 16 to prevent the roller sleeve 18 from slipping while in use. The roller sleeve 18 can be any elastomer or synthetic rubber, preferably a urethane composition having a shore A hardness of 40 to 60 and a wall thickness of 0.25 to 1.00 inches. The face width of the roller sleeve preferably ranges from 4 to 10 inches and the diameter can range between 12 to 25 inches. Other dimensional measurements may be consistent with special uses of the roller sleeve 18 that can be manufactured to meet the requirements of the machinery dimensional specifications.

The enlarged view in FIG. 1A of the junction between the inner flange plate 12b and the roller sleeve 18 more clearly shows the cooperating circumferential notch 19 in the flange 12b as it captures the edge of the base 20 of the roller sleeve 18. The circumferential notch 19 and shoulder 21 allows the outer flange plate 12b to slide into and out of place against the mounting hub 14 for ease of mounting and dismounting when the roller sleeve 18 is worn and needs to be replaced. The circumferential notch 19 on the flange plate 12b is approximately 0.012 inches and accepts the more rigid base 20 of the roller sleeve 18 forming a snug fit between them. There is another undercut or bevel 23 along the outer periphery of each flange plate 12a, 12b to accommodate the outer roller material 22 of roller sleeve 18 therebetween. See, FIG. 1B. The removal of the outer flange plate 12a from the mounting hub 14, by removing only the mounting screws 13a and sliding the roller sleeve 18 off of and away from the mounting hub 14, allows for the existing mounting hub 14 to remain in position while changing only the roller sleeve 18 and without disengaging the inner flange plate 12b. Thus, the end user can replace a worn roller sleeve 18 by removing only the outer flange plate 12a. Then it becomes a requirement for maintaining machine up time for only the roller sleeve 18 to be inventoried by the end user for a rapid exchange of a new part for a worn one.

FIG. 2 shows an outer front face view of the quick release roller sleeve mounting hub assembly 10 of the present invention. In this first embodiment, the quick release assembly 10 has a large diameter mounting hub 14 including a set of six apertures 15 through which a series of fastening means extend for attaching the mounting hub 14 to the machinery. The apertures 15 are spaced about the inner circumferential opening of the mounting hub 14 at points approximating 60° separations between each of them. Shown in the inner flange plate 12b are a set of four mounting apertures 13d for mounting the flange plate to the mounting hub 14. As can be seen from FIG. 3, the outer flange plate 12a also has a set of four mounting apertures 13c for mounting the flange plate 12a to the mounting hub 14. The mounting apertures 13c, 13d are spaced about the periphery of the outer flange plates 12a, 12b at points approximating 90° separations between each of them.

Figure 3:
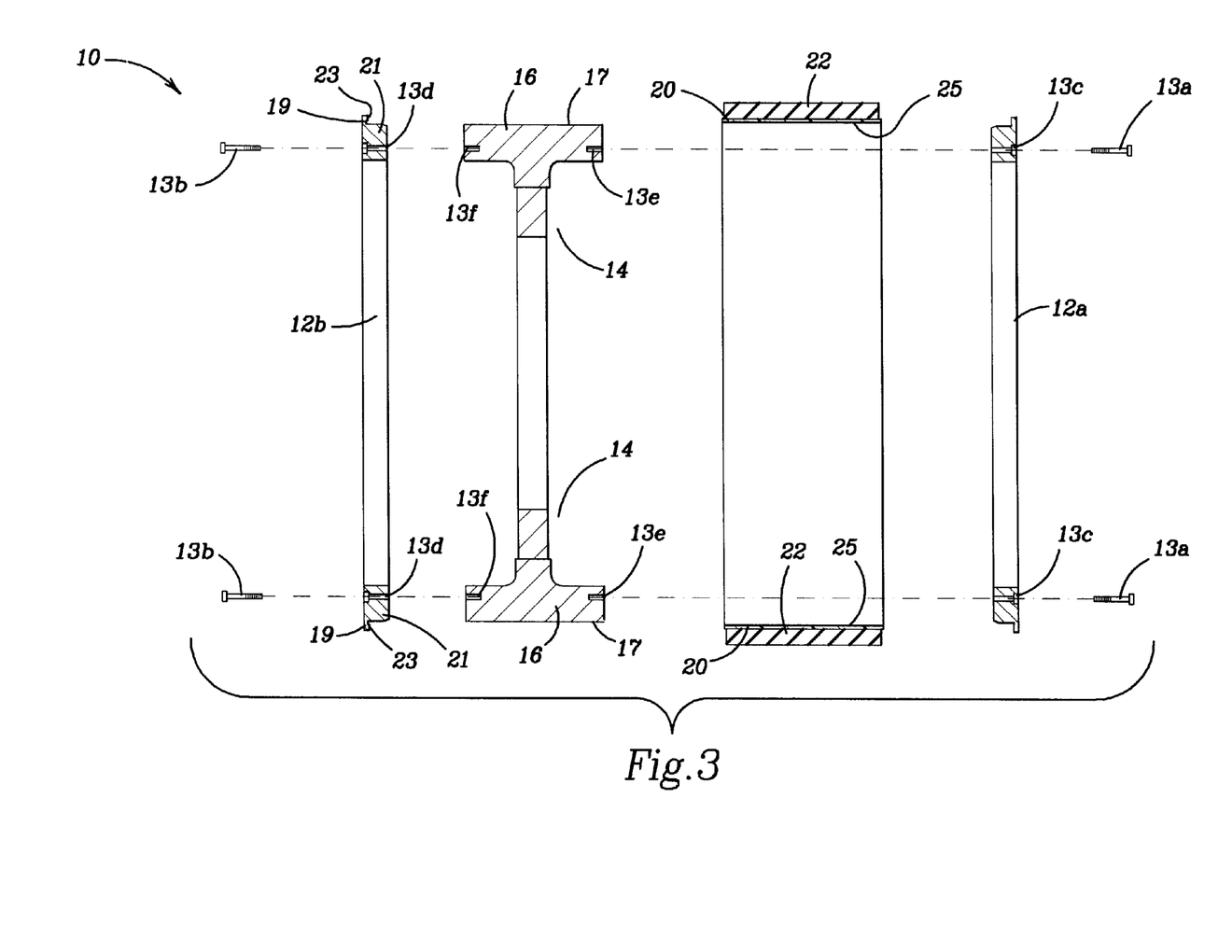
FIG. 3 is an exploded side view of the quick release roller sleeve and mounting hub assembly of the present invention.

Referring now to FIG. 3, there is shown an exploded view of the present invention, the quick release sleeve and mounting hub assembly 10. Starting from the left, the inner facing flange plate 12b has a shoulder 21 that mates to the outer diameter 17 of the support rim 16 of the mounting hub 14 and an outwardly extending bevel 23 at the peripheral circumference of the plate 12b with the notch 19 located in between them. The inner flange plate 12b is mounted to the support rim 16 with fasteners 13b that extend through apertures 13d into threaded receiving holes 13f in the support rim 16.

The support rim 16 provides a base for the attachment of the paired inner and outer flange plates 12a, 12b. The outer circumference of the support rim 16 provides the support for the roller sleeve 18 with the two parts being dimensioned such that the inner diameter face 25 of the roller sleeve 18 slips over and contacts the outer diameter 17 face of the support rim 16. The roller sleeve 22 is seated on the support rim 16 and pinched between the paired outer flange plates 12a, 12b. Also formed by the mating alignment of the flange plates 12a and 12b and the roller sleeve 18 is a seal that acts to prevent liquids used with the roller assembly from entering into the space between the roller sleeve 18 and the hub 14 that could retard the ease in dismounting the roller sleeve 18 when worn.

The outward facing flange plate 12a mounts to the support rim 16 in the same way as the inner flange plate 12b with fasteners 13a that extend through apertures 13c into threaded receiving holes 13e in the support rim 16. At the center of the support rim 16 is the mounting hub 14 that surrounds the central aperture utilized to mount the support rim 16 to the roller hub (not shown). Each of the apertures 15 are used to affix the mounting hub 14 to the roller hub when originally positioning the assembly 10. In this way, the mounting hub 14 remains affixed to the roller hub and only the roller sleeve 18, when worn, need be replaced by removing only the outer flange plate 12a, replacing the roller sleeve 18 and then replacing the outer flange plate 12a, all without dismounting the entire assembly 10 or disturbing the mounting hub alignment on the roller hub and allowing for only minimal down time of the machinery. During the exchange of the roller sleeve 18, the inner facing flange plate 12b remains attached to the mounting hub 14.

Figure 4:
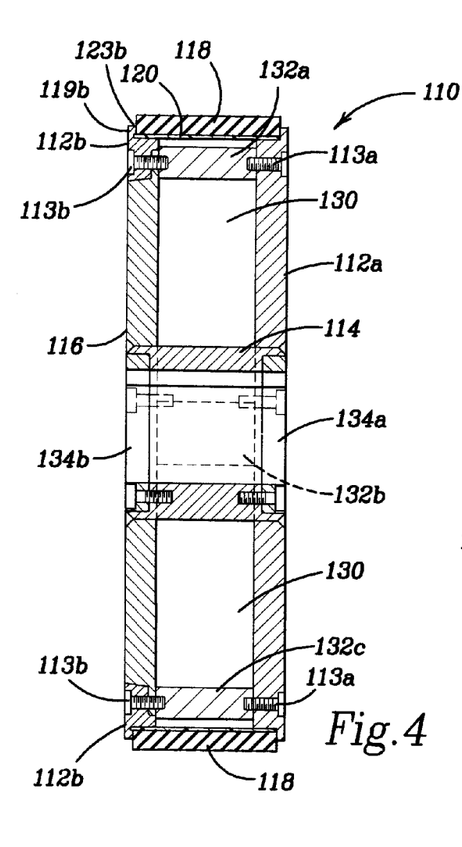
FIG. 4 is a sectional side view of a second embodiment of the quick release roller sleeve and mounting hub of the present invention.

Shown in FIG. 4 is a second embodiment of the quick release roller sleeve and mounting hub assembly 110 of the present invention having a differently sized central aperture for mounting to a roller hub. The quick release assembly is comprised of a pair of opposing inner and outer flange plates 112a, 112b, a mounting hub 114 having an outward facing support rim 116, and a roller sleeve 118. The inner flange plate 112a is secured to the support rim 116 across an inner space 130 dimensioned exactly to the length of quadrilaterally positioned spacer blocks 132a-132d mounted to the inner flange plate 112a. The spacer blocks 132b and 132d overlie one another in the view presented with spacer block 132b shown in phantom lines. The quadrilaterally positioned spacer blocks 132a-132d extend across the inner space 130 and provide a connecting point for the support rim 116 as well as a positioning and mounting point for the roller sleeve 118 that extends around the outer circumference of the outer flange plate 112a but inside of the outer flange 123a. The inward face of the support rim 116 lies against the set of spacer blocks 132a-132d. A set of mounting screws 113a extend through the outer flange plate 112a through the support rim 116 and into the set of spacer blocks 132a-132d as shown in FIGS. 4 and 6.

Figure 6:
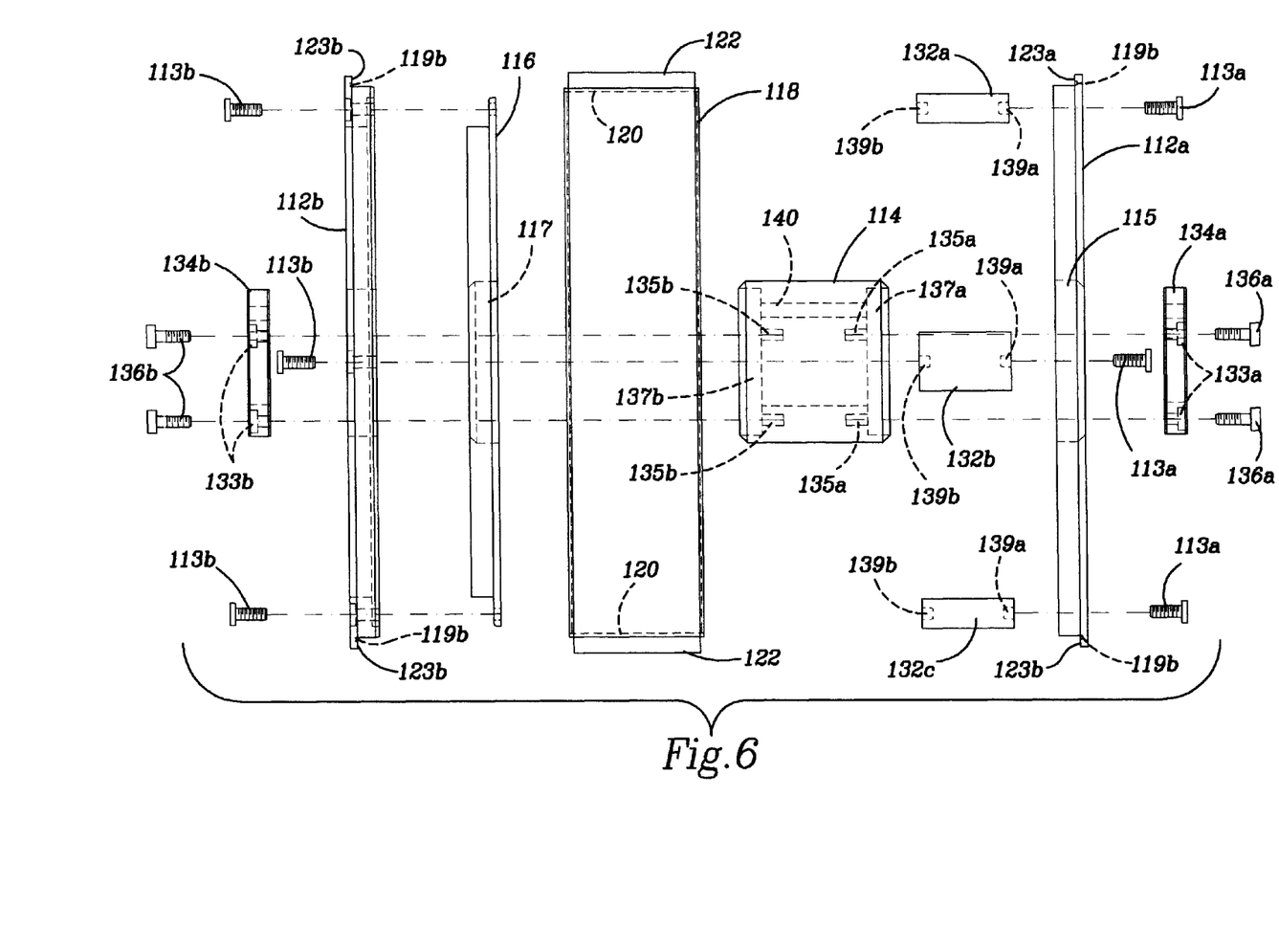
FIG. 6 is an exploded side view of the second embodiment of the quick release roller sleeve and mounting hub of the present invention.

As can be seen from FIGS. 4 and 6, the outer flange plate 112b captures the base 120 of roller sleeve 118 within a cooperating circumferential notch 119b slightly inward of the outer edge of the flange plate 112b. The outer roller material 122 of sleeve 118 extends outward from the base 120 in accordance with the general dimensions set forth below. The base 120 of roller sleeve 118 is constructed of fiberglass or other composite resin-type material. This resin material may be any suitable thermoset such as an epoxy or polyester. The thickness of the base 120 of the roller sleeve 118 is in the range of 1/16 to 1/4 inches to provide stability to the outer roller material 122. The cooperating circumferential notch 119b and undercut or bevel 123b extending outward from the flange plate 112b captures the roller sleeve 118 between these named elements on the outer flange plate 112b and the same arrangement of elements 119a, 123a on the inner flange plate 112a. This structural arrangement is identical to that described in connected with FIGS. 1A and 1B.

The outer diameter of the support rim 116 is slightly smaller than the diameter of the roller sleeve 118 which allows the roller sleeve 118 to slide over the support rim 116 and onto the inner flange plate 112b. The flange plates 112a, 112b when positioned opposing one another capture the edges of the roller sleeve 118 between them and grip the base 120 to prevent the roller sleeve 118 from slipping while in use. As above, the roller sleeve 118 can be any elastomer or synthetic rubber, preferably a urethane composition having a shore A hardness of 40 to 60 and a wall thickness of 0.25 to 1.00 inches. The face width of the roller sleeve preferably ranges from 4 to 10 inches and the diameter can range between 12 to 25 inches. Other dimensional measurements may be consistent with special uses of the roller sleeve 118 that can be manufactured to meet the requirements of the machinery dimensional specifications.

The support rim 116 is dimensioned to fit within the outer flange plate 112b when completing the remounting of the sleeve 118. The support rim 116 is press fit over a mounting hub 114 that extends between the inner faces of the support rim 116 and the inner flange plate 112a across the space 130. Likewise, the inner flange plate is press fit over the hub 114 by fitting the central opening 115a around the hub 114. A pair of inner and outer collars 134a, 134b captures the inner flange plate 112b and the support rim 116 respectively between them and against the mounting hub 114. Both the outer flange plate 112a and the support rim 116 have central openings 115b, 117, respectively, that accommodate the mounting hub 114 and allow the collars 134a, 134b to retain the inner flange plate 112a and support rim 116 against and securely affixed to the mounting hub 114. A first set of fastening means or screws 136b are used to mount the support rim 116 to the mounting hub 114. A second set of fastening means or screws 136a are used to mount inner flange plate 112a to the mounting hub 114 securing the collar 134a to the mounting hub 114. The screws 136a, 136b are spaced apart approximately 120° around the circumference of the collars 134a, 134b and extend through countersunk apertures 133a, 133b in the collars 134a, 134b into threaded receiving holes 135a, 135b in opposite sides of the mounting hub 114.

As is shown in FIGS. 4 and 6, the mounting hub 114 fits into and against a matching inward flange in each of the inner flange plate 112a and the support rim 116 with each of the collars 134a, 134b fitting into outward facing recesses 137a, 137b in the mounting hub 114 such that attachment the of these parts one to the other creates a rigid assembly for supporting the roller sleeve 118. Also formed by the mating alignment of the flange plates 112a and 112b and the roller sleeve 118 is a seal that acts to prevent liquids used with the roller assembly from entering into the space between the roller sleeve 118 and the hub 114 that could retard the ease in dismounting the roller sleeve 118 when worn.

Figure 5:
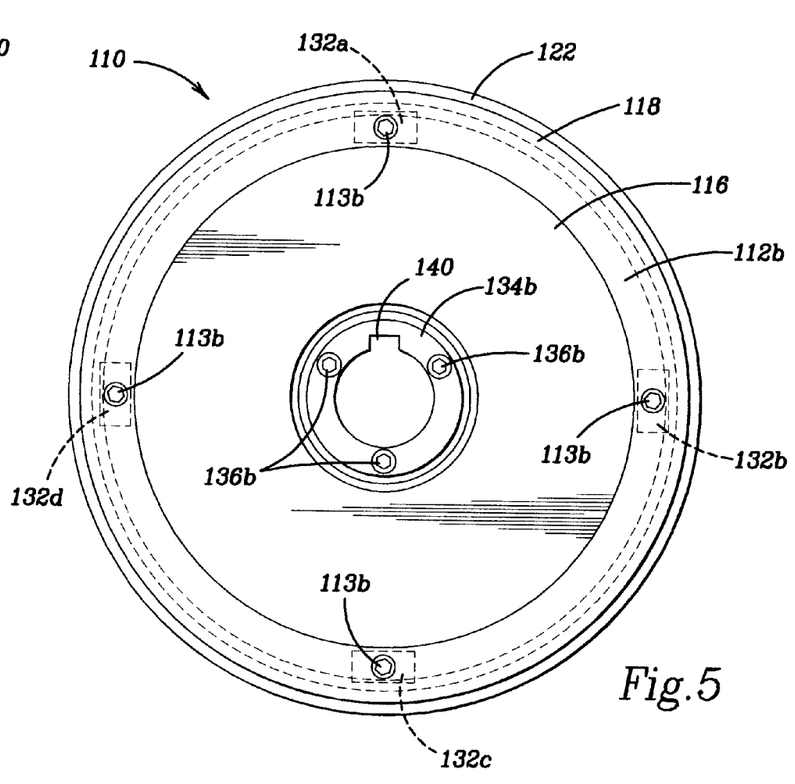
FIG. 5 is a front view of the second embodiment of the quick release roller sleeve and mounting hub of the present invention.

FIG. 5 shows the front view of the second embodiment of the present invention 110 that exhibits a much smaller diameter central aperture for mounting the assembly to a machine or high speed roller apparatus than the larger diameter for mounting shown in FIG. 2. The outer flange plate 112b having a very large diameter opening such that the flange plate 112b fits snugly over the support rim 116 and is mounted to the assembly containing the support rim 116 and the mounting hub 114 by four fastening means 113b that are secured into threaded apertures 139b located in each of the spacers 132a-d. On the opposite side the outer flange plate 112a is also secured in position using four fastening means 113a that are secured into threaded apertures 139a in each of the four spacers 132a-d. The mounting hub 114 located at the center of the support rim 116 has a key notch 140 shown extending upwards from the round opening for engaging a keyed shaft of the machine or high speed roller apparatus.

The exploded view in FIG. 6 of the second embodiment of the present invention 110 shows the differently configured mounting hub 114 being attached between the center portion of the support rim 116 and the inner flange plate 112b. The removal of the outer flange plate 112a exposes the roller sleeve 118 such that the roller sleeve 118 can be removed and replaced without having to remove the entire assembly 110 from the machine or high speed roller apparatus. In this way the assembly remains in its aligned position on the machine or high speed roller apparatus without the need for extended downtime to realign the roller sleeve 118 or the entire assembly 110.

Figure 7:
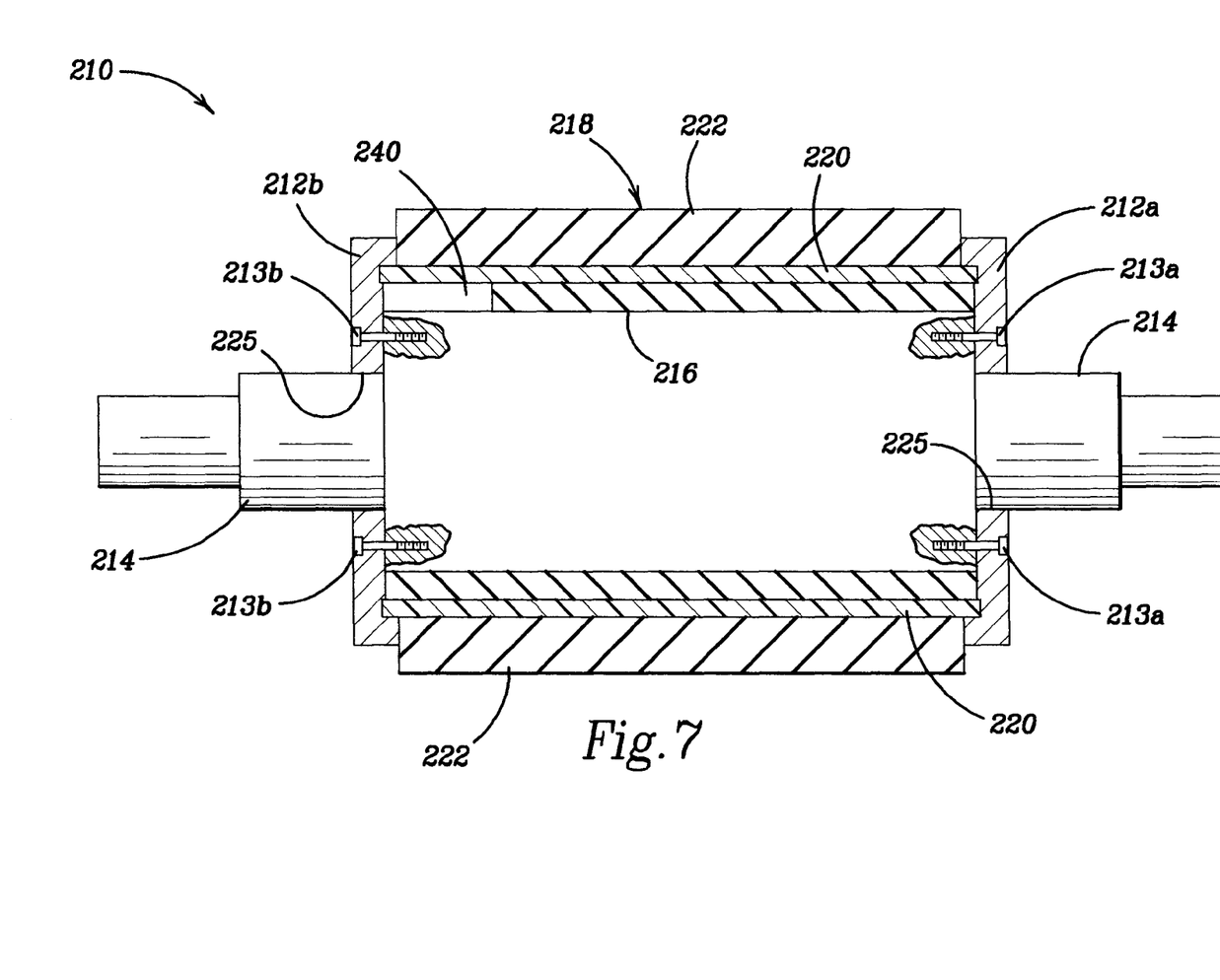
FIG. 7 is a partial sectional side view of a third embodiment of the quick release roller sleeve and mounting hub of the present invention.
Figure 8:
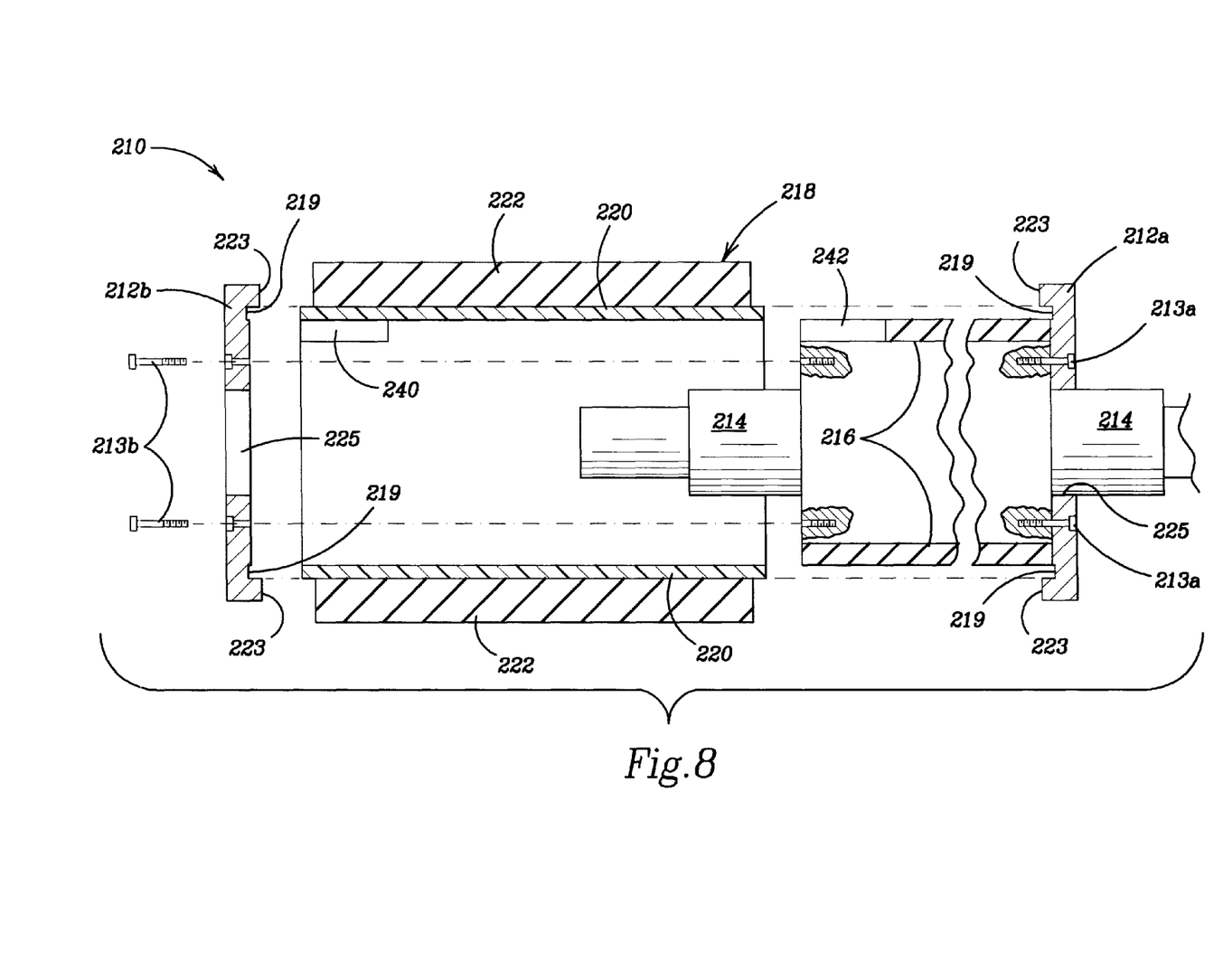
FIG. 8 is an exploded side view of the third embodiment of the quick release roller sleeve and mounting hub of the present invention.

A third embodiment of the quick release roller sleeve and mounting hub assembly 210 of the present invention is presented in FIGS. 7, 8. The quick release assembly is comprised of a pair of opposing inner and outer flange plates 212a, 212b, a mounting hub 214 having an outer support surface 216, and a roller sleeve 218. In this embodiment the exploded view of FIG. 8 depicts the outward facing side of the quick release assembly to the left instead of the right as was done in the prior two embodiments to demonstrate that the invention will work regardless of the mounting position. The inner flange plate 212a is secured to the support surface 216 across the inward face of the hub 214 by a set of mounting screws 213a. Likewise, the outer flange plate 212b is secured to the support rim 216 across the outward face of the hub 214 by a set of mounting screws 213b. The outer flange plate 212b captures the base 220 of roller sleeve 218 within cooperating notch 219 slightly inward of the outer edge of the flange plate 212b. Likewise, inner flange plate 212a captures the base 220 of roller sleeve 218 within cooperating notch 219 slightly inward of the outer edge of the flange plate 212a. The outer roller material 222 of sleeve 218 extends outward from the base 220 in accordance with the general dimensions set forth below. The base 220 of roller sleeve 218 is constructed of fiberglass or other composite resin-type material. The resin material may be any suitable thermoset such as an epoxy or polyester. The thickness of the base 220 of the roller sleeve 218 is in the range of 1/16 to 1/4 inches to provide stability to the outer roller material 222.

The support surface 216 of the mounting hub 214 is slightly smaller than the roller sleeve 218 in depth and diameter which allows the roller sleeve 218 to slide onto the mounting hub 214. Each flange plate 212a, 212b extends the flat surface of the support surface 216 and pinches the base 220 of the roller sleeve 218 between them (an within the respective notches 219) to secure the roller sleeve 218 to the mounting hub 214. The flange plates 212a, 212b seal the edges of the roller sleeve 218 between them and grip the base 216 to prevent the roller sleeve 218 from slipping while in use. The roller sleeve 218 can be any elastomer or synthetic rubber, preferably a urethane composition having a shore A hardness of 40 to 60 and a wall thickness of 0.25 to 1.00 inches. The face width of the roller sleeve preferably ranges from 4 to 10 inches and the diameter can range between 12 to 25 inches. Other dimensional measurements may be consistent with special uses of the roller sleeve 218 that can be manufactured to meet the requirements of the machinery dimensional specifications.

The exploded view in FIG. 8 shows one clearly the junction between the outer flange plate 212b and the roller sleeve 218 and more clearly shows the cooperating notch 219 in the flanges 212a, 212b as they capture the edges of the base 220 of the roller sleeve 218. The notch 219 and central aperture 225 allows the outer flange plate 212b to slide into and out of place against the mounting hub 214 for ease of mounting and dismounting when the roller sleeve 218 is worn and needs to be replaced. The notch 219 on the flange plate 212b is approximately 0.012 inches and accepts the more rigid base 220 of the roller sleeve 218 forming a snug fit between them. There is another undercut or bevel 223 along the outer periphery of each flange plate 212a, 212b to accommodate the outer roller material 222 of roller sleeve 218 therebetween. As described above, formed by the mating alignment of the flange plates 212a and 212b and the roller sleeve 218 is a seal that acts to prevent liquids used with the roller assembly from entering into the space between the roller sleeve 218 and the hub 214 that could retard the ease in dismounting the roller sleeve 218 when worn.

The removal of the outer flange plate 212b from the mounting hub 214, by removing only the mounting screws 213b and sliding the roller sleeve 218 off of and away from the mounting hub 214, allows for the existing mounting hub 214 to remain in position while only changing the roller sleeve 218. Thus, the end user can replace a worn roller sleeve 218 by removing only the outer flange plate 212b. Then it becomes a requirement for maintaining machine up time for only the roller sleeve 218 to be inventoried by the end user for a rapid exchange of a new part for a worn one.

In FIG. 8 the exploded side view of the second embodiment of the present invention 210 shows a roller hub that has been modified for secure mounting of the quick release roller sleeve assembly to a machine or high speed roller apparatus. The outer flange plate 212b has an appropriately dimensioned aperture 225 such that the flange plate 112b fits over the mounting hub 214 that provides the support surface 216 and is mounted to the assembly containing the inner flange plate 212a, the support surface 116, and the mounting hub 214 by a set of fastening means 213b. The roller sleeve 218 has an inwardly extending key 240 shown extending part way along the length of the sleeve 218 from its proximal outer end for engaging a keyway 242 located along the support surface 216 on the mounting hub 214. The engaging of the key 240 in the keyway 242 prevents the roller sleeve 218 from slipping and changing rotational speed as the hub 214 turns within the high speed machine. The removal of the outer flange plate 212b exposes the roller sleeve 218 such that the roller sleeve 218 can be removed replaced without having to remove the entire assembly 210 from the machine or high speed roller apparatus. In this way the assembly remains in its aligned position on the machine or high speed roller apparatus without the need for extended downtime to realign the roller sleeve 218 or the entire assembly 210.

The present invention may be embodied in other specific forms without departing from the spirit or essential attributes thereof and, accordingly, the described embodiments are to be considered in all respects as being illustrative and not restrictive, with the scope of the invention being indicated by the appended claims, rather than the foregoing detailed description, as indicating the scope of the invention as well as all modifications which may fall within a range of equivalency which are also intended to be embraced therein.

The invention claimed is:

1. A quick release roller sleeve assembly for use in high speed rotational machinery comprising:
   a hub for rotationally mounting to the machinery having an external support surface spaced outward from its longitudinal center describing a cylindrical shape, said hub once mounted and aligned for high speed rotational movement remains mounted to the machinery;
   a roller sleeve dimensioned for sliding over and engaging the external support surface of the hub, said roller sleeve having an inner core that is minimally compressible at its ends for inward clamping and an outer shell for contacting a workpiece;
   said hub having inner and outer flange plates for securing the roller sleeve in position on the external support surface of the hub, said outer flange plate located at the proximal exposed outer end of the hub and said inner flange plate located at the distal end of the hub attached to the machinery;
   each of said inner and outer flange plates having an annular recess for mating with the minimally compressible ends of a first section of the roller sleeve to capture said roller sleeve, creating a seal between the outer shell of the roller sleeve and the hub, and retaining the roller sleeve in an aligned position about the hub for synchronized rotational movement with the hub;
   said outer flange plate capable of being readily removed from the assembly for replacing the roller sleeve,
   whereby only said outer flange plate is required to be removed and reinstalled to effect a replacement of the roller sleeve about the hub without removing and reinstalling the hub onto the high speed rotational machinery.

2. The quick release roller assembly of claim 1, wherein the hub has at least one keyway for mating with and securing a key located on the roller sleeve.

3. The quick release roller assembly of claim 1, wherein the inner and outer flange plates have at least one alignment point for mating with a cooperating alignment point located on the hub for securing the flange plates to the hub in a predetermined orientation.

4. The quick release roller assembly of claim 1, wherein the length of the roller sleeve ranges from about 4 inches to at least 36 inches.

5. The quick release roller assembly of claim 1, wherein the diameter of the roller sleeve ranges from about 6 inches to at least 30 inches.

6. The quick release roller assembly of claim 1, wherein the thickness of the roller sleeve ranges from about ½ inch to 1 inch.

7. The quick release roller assembly of claim 1, wherein the roller sleeve is comprised of the group of materials consisting of fiberglass, resin-type thermoset materials such as epoxy and polyester, and combinations thereof.

8. The quick release roller assembly of claim 1, wherein the seal created between the ends of the roller sleeve and the inner and outer flange plates prevent liquids from entering into the space between the roller sleeve and the support surface of the hub retarding ease of removal and replacement of the roller sleeve.

9. A method for replacement of a quick release roller sleeve assembly for use in high speed rotational machinery comprising the steps of:
   rotationally mounting a hub at its distal end to the high speed rotational machinery, said hub having an external support surface extending between its distal and proximal ends spaced outward from its longitudinal center describing a cylindrical shape;
   providing inner and outer flange plates at the proximal and distal ends of the hub, said outer flange plate being located at the proximal exposed outer end of the hub and said inner flange plate being located at the distal end of the hub attached to the machinery, for securing a roller sleeve in position on the external support surface of the hub, said roller sleeve having an inner core that is minimally compressible at its ends for inward clamping and an outer shell for contacting a workpiece;
   providing each of said inner and outer flange plates with an annular recess for mating with the minimally compressible ends of the roller sleeve to capture said roller sleeve, creating a seal between the outer shell of the roller sleeve and the hub, and retaining the roller sleeve in an aligned position about the hub for synchronized rotational movement with the hub;
   removing said outer flange plate from the outer exposed end of the hub exposing the core of the roller sleeve, removing said roller sleeve from the hub, and positioning a new roller sleeve dimensioned for sliding over and engaging the external support surface of the hub onto the hub;
   replacing said outer flange plate capturing the minimally compressible ends of the roller sleeve in the annular recesses of the outer and inner flange plates at the opposite ends of the hub and clamping the roller sleeve in position about the hub with the tightening of only the outer flange plate,
   whereby only said outer flange plate is required to be removed and reinstalled to effect a replacement of the roller sleeve about the hub without removing and reinstalling the hub onto the high speed rotational machinery.

10. The method of claim 9, comprising the additional step of providing the hub with at least one keyway for mating with and securing a key located on the roller sleeve.

11. The method of claim 9, comprising the additional step of providing the inner and outer flange plates with at least one alignment point for mating with a cooperating alignment point located on the hub for securing the flange plates to the hub in a predetermined orientation.

* * * * *